United States Patent [19]

Marquez

[11] Patent Number: 4,987,827
[45] Date of Patent: Jan. 29, 1991

[54] COOKING APPARATUS

[76] Inventor: Mariaelena S. Marquez, 4231 Serena Ave., Oceanside, Calif. 92056

[21] Appl. No.: 495,392

[22] Filed: Mar. 19, 1990

[51] Int. Cl.⁵ ............................................. A47J 37/00
[52] U.S. Cl. ...................................... 99/331; 99/342; 99/349; 99/375; 99/378; 99/379; 99/390; 99/425
[58] Field of Search .................. 99/331, 332, 342–349, 99/375, 377–379, 390, 391, 400, 403, 372, 383, 389, 394, 424, 425, 426, 430; 219/524, 525, 443

[56] References Cited

U.S. PATENT DOCUMENTS

| 992,417 | 5/1911 | Gale | 99/379 |
| 1,866,874 | 7/1932 | Barnes et al. | 99/379 |
| 2,012,546 | 8/1935 | Reinhardt | 99/375 |
| 2,057,501 | 10/1936 | Parr | 99/379 |
| 2,197,056 | 4/1940 | Nelson | 219/525 |
| 2,632,379 | 3/1953 | Kudo | 99/375 |
| 2,748,690 | 6/1956 | Lipisch et al. | 99/340 |
| 3,313,230 | 4/1967 | Simjian | 99/375 |
| 3,696,734 | 10/1972 | Beasley et al. | 219/525 |
| 3,880,064 | 4/1975 | Martinez | 219/524 |
| 4,088,067 | 5/1978 | Ketbitzch | 99/379 |
| 4,091,720 | 5/1978 | Wheeler | 99/430 |
| 4,586,428 | 5/1986 | Adamson | 99/379 |
| 4,697,504 | 10/1987 | Keating | 99/331 |
| 4,838,153 | 6/1989 | Escamilla et al. | 99/349 |

FOREIGN PATENT DOCUMENTS 2335872 1/1974 Fed. Rep. of Germany ...... 219/524

Primary Examiner—Timothy F. Simone
Attorney, Agent, or Firm—Andsel Group; David L. Baker

[57] ABSTRACT

An apparatus for cooking food stuffs especially for frying batter into tortillas. The apparatus has two separate cooking areas. One area has an upper and a first lower heating surface for precooking the tortilla and one area has a single second lower heating surface for additional preparation of the tortilla such as adding and warming a filling or finishing the cooking of the tortilla batter. There is a separate temperature control for each cooking area, an on/off switches and power on indicator light for each cooking area. The apparatus has a tension means that biases the upper heating surface in an open position relative to the first lower heating surface. The heating surfaces have a coating on them to reduce adherence of food stuffs during cooking and to aid in the cleaning of the heating surfaces. There are suction cup feet on the lower housing to reduce any undesirable movement.

5 Claims, 1 Drawing Sheet

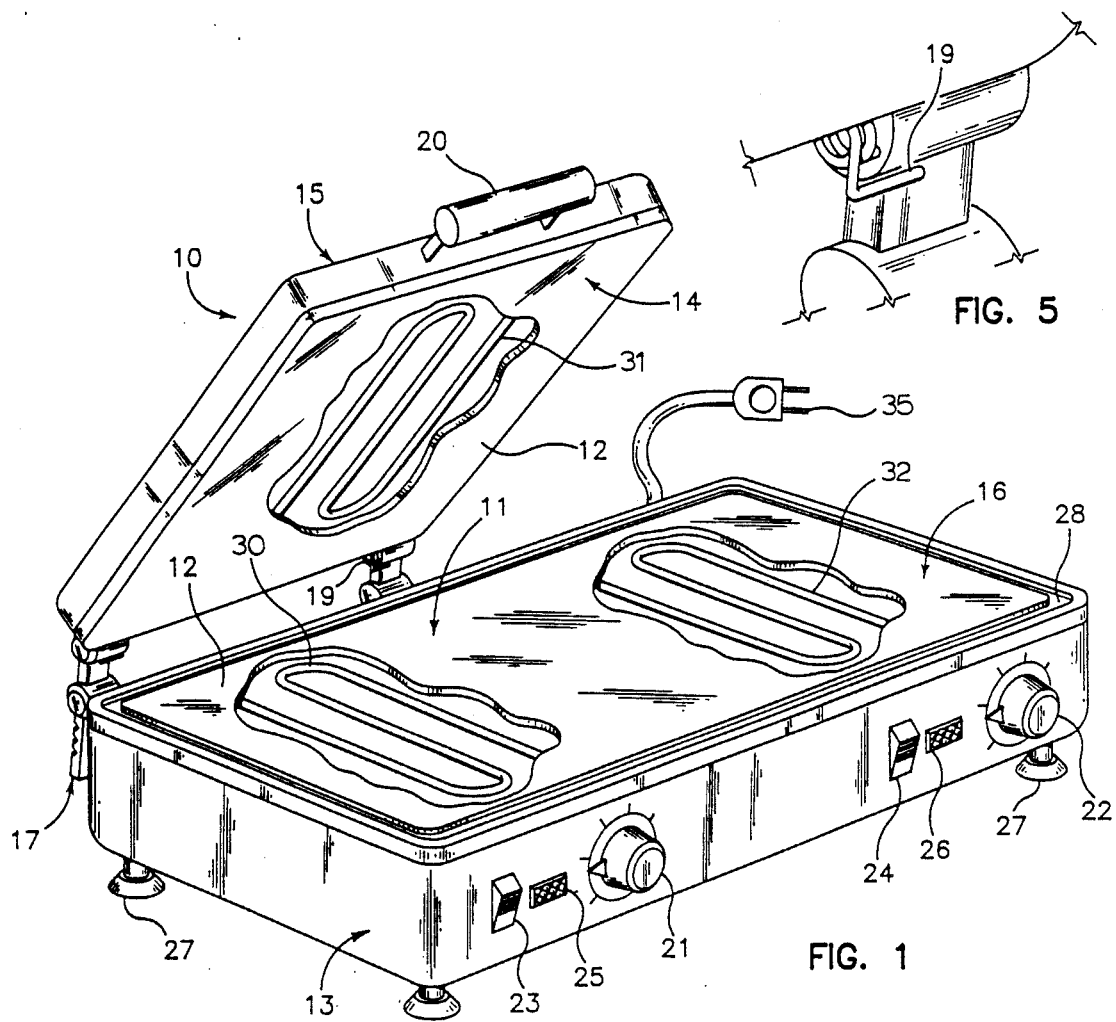
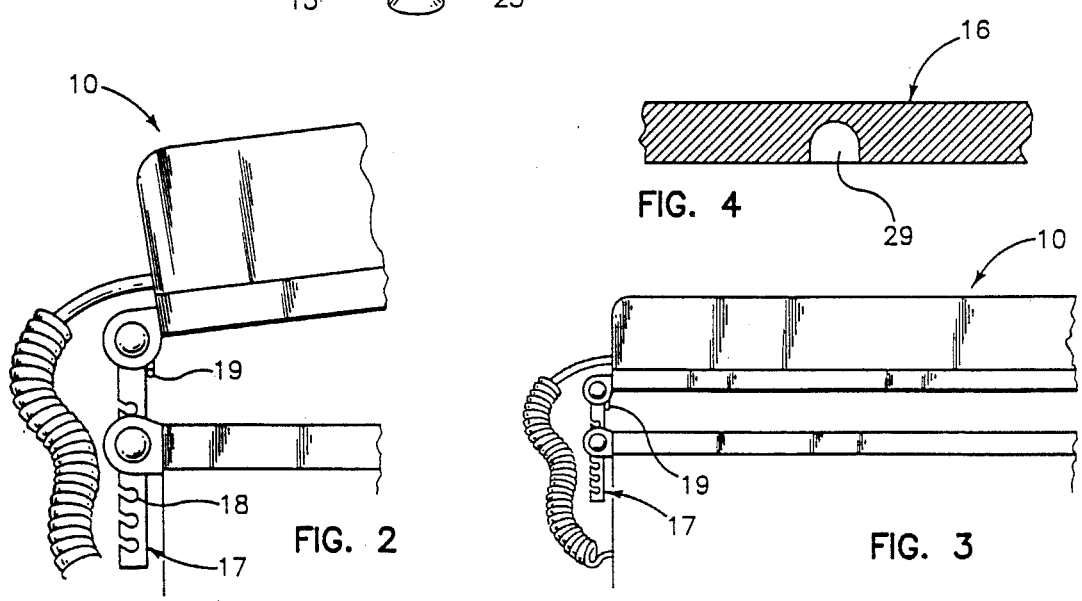

COOKING APPARATUS

BACKGROUND OF THE INVENTION

1. Field of the Invention

This invention relates generally to an apparatus for cooking food and more particularly to cooking batter into a tortilla. The apparatus has two main cooking areas. One cooking area with two heating surfaces and one cooking area with a single heating surface.

2. Description of the Related Art

Many devices to grill sandwiches have been developed in the past. Many of the recent inventions have been directed toward novel hinges that assist in applying an even pressure to the sandwich between the upper and lower surface.

U.S. Pat. No. 1,866,874 to W. A. Barnes, et al., on July 2, 1932 shows an electric toaster with two heating grids with separable hinges that allow the two heating grids to be used separately, if desired.

U.S. Pat. No. 2,012,546 to E. F. Reinhardt on Aug. 27, 1935 describes an electric griddle with a double-hinged upper and lower grid, a grease trap and an on/off switch.

U.S. Pat. No. 2,057,501 to B. F. Parr on Oct. 13, 1936 shows a sandwich grill with an expandable hinge that allows the upper and lower grid to remain parallel.

U.S. Pat. No. 2,748,690 to M. L. Lipsich, et al., on June 5, 1956 describes a cooking device with two heating grids pivoting on adjustable hinges and having a wire grill allowing meats to be broiled, a grease groove, an on/off switch and a light that tells the user that the power is on.

U.S. Pat. No. 4,088,067 to Johannes W. Kaebitzsch on May 9, 1978 shows a cooking appliance with an upper and lower heating grid hinged together with a adjustable counterbalance spring that prevents excessive pressure from being applied to the food between the grids.

None of these grills are adapted to the needs of a user that desires to cook a tortilla. The present invention has two completely separate cooking areas, one for cooking the tortilla batter and another for heating the food stuffs wrapped within the crepe-like tortilla or for maintaining the warmth of the freshly cooked tortilla. Each of the cooking areas is separately temperature controlled to accommodate the needs of the user. The apparatus of the present invention, with its adjustable hinges, can be adapted to cooking other food stuffs such as sandwiches. This makes the present invention a useful multi purpose cooker and a specialty apparatus for the making of tortillas. There are many times when preparing tortillas that the user will not be able to maintain a consistent quality and uniformity by utilizing conventional utensils such as a frying pan. The tortilla can have an uneven thickness and each side might be cooked at a different temperature resulting in a not so palatable tortilla. The present invention allows uniform temperature cooking on both sides and with the settings provided on the hinges, a uniform thickness is achieved. The related art cited above does allow for a separate cooking surface for secondary preparation nor for separately controlled temperature.

SUMMARY OF THE INVENTION

The present invention is a cooking apparatus which will fry a preselected thickness of batter into a tortilla at a preselected temperature to provide a uniform consistency tortilla. One side of the apparatus provides a double-sided cooking area to permit frying the tortilla on both sides at one time in order to pre-cook the tortilla in a uniform manner and the other side of the apparatus allows the user to place the tortilla on a single-sided cooking area and place a filling on the tortilla. On the single side, the pre-cooked tortilla and the filling can continue frying until both are ready to serve. The upper and lower heating surfaces of the double sided cooking area are hinged in such a manner as to allow adjustable parallel pressure on the tortilla to provide a uniform thickness. The upper heating surface is spring loaded open so that the user must hold the upper surface down on the lower surface. Since a tortilla is relatively thin, a uniform thickness is necessary to reduce the chance of under or over-cooking.

The heating surfaces are electrically heated and the double-sided area and the single-sided area have separate temperature thermostat controls. The heating surface temperature controls are featured to permit dialing of a temperature selected by the user to properly fry the thickness of batter selected. A light indicates to the user that the heating surfaces are electrically activated. An on/off switch is provided to activate the power to the heating surfaces.

A cooking apparatus is described that has a first lower heating surface in a lower housing, an upper heating surface in an upper housing and a second lower heating surface in the lower housing. There is an adjustable hinge means hingingly connecting the lower and upper housing and a tension means to bias the upper heating surface in an open position relative to a closed position closely adjacent the first lower heating surface.

Included in the cooking apparatus is a first heating means to heat the first lower heating surface, a second heating means to heat the upper heating surface and a third heating means to heat the second lower heating surface. There is a first temperature control means in the lower housing to control the temperature of the first lower and the upper heating means and a second temperature control means in the lower housing to control the temperature of the second lower heating means.

A power cord is included to plug the apparatus into an electrical power source. There is a first switch in the lower housing to interrupt power to the first lower and the upper heating means and a second switch in the lower housing to interrupt power to the second lower heating means. To assist the user, a first indicator light in the lower housing to indicate power to the first lower and the upper heating means and a second indicator light in the lower housing to indicate power to the second lower heating means is provided. There is a handle on the upper housing to position the upper heating surface in the closely adjacent position relative to the first lower heating surface.

The cooking apparatus may have a coating on the first lower, the upper and the second lower heating surfaces to reduce adherence of food stuffs. There may also be a plurality of suction cup feet on the lower housing and a grease groove around the perimeter of the first and second lower heating surfaces.

It is therefore an object of this invention to provide a cooking apparatus particularly for frying batter into tortillas.

It is another object of this invention to provide a cooking apparatus that has two separately temperature controlled cooking areas to enable the user to preprepare a tortilla on the cooking area that has an upper and a lower heating surface and then finish preparing the tortilla complete with a filling if desired on the cooking area that has only a lower heating surface.

It is yet another object of this invention to provide a cooking apparatus that has a spring-loaded hinge that biases the upper heating surface in an open position requiring the user to hold the upper surface in a closed position in order to cook the tortilla and then by releasing the downward pressure on the upper heating surface allowing the upper heating surface to spring up to the open position once again.

It is another object of this invention to supply suction cup feet on the cooking apparatus so that the apparatus does not move about on the work surface when such movement is not desired.

It is another object of this invention to provide a cooking apparatus that has adjustable hinges to allow the user to vary the thickness of the tortilla or to cook a food stuff such as a sandwich.

BRIEF DESCRIPTION OF THE DRAWINGS

FIG. 1 is perspective view of the cooking apparatus with the upper heating surface in the open position.

FIG. 2 is a partial expanded view of the hinge and spring means.

FIG. 3 is a perspective view of the cooking apparatus with the upper surface in the closed position.

FIG. 4 is a partial sectional view of the area of the lower heating surfaces showing a lateral groove separating the lower heating surfaces to reduce heat transfer.

FIG. 5 is an enlarged partial view of the tension means shown in FIG. 1.

DESCRIPTION OF THE PREFERRED EMBODIMENT

Referring to FIGS. 1, 2, and 3, a cooking apparatus 10 is shown. A cooking apparatus 10 has a first lower heating surface 11 with a coating 12 thereon to reduce adherence of food stuffs (not shown). The coating 12 could be a nonstick material such as that sold under the trademark TEFLON. The first lower heating surface 11 is in a lower housing 13. There is an upper heating surface 14 in an upper housing 15. The upper heating surface 14 has a coating 12 thereon to reduce the adherence of food stuffs. There is a second lower heating surface 16 in the lower housing 13 with a coating 12 thereon to reduce adherence of food stuffs. There is a lateral groove 29 that separates the first lower heating surface 11 from the second lower heating surface 16. The thickness of the groove 29 is less than the thickness of the lower heating surfaces. The lower heating surfaces may be one plate, as shown, separated by the lateral groove 29. The lateral groove 29 extends from a point near the control area or front of the apparatus 10 to a point near the hinge are of the apparatus 10.

There is an adjustable hinge mean 17 hingingly connecting the upper housing 15 and the lower housing 13. The hinge 17 has a plurality of longitudinally spaced apart grooves 18 that provide preselected thicknesses of tortilla batter or other food stuffs to be placed between the upper heating surface 11 and first lower heating surface 14. The grooves 18 hook onto a retaining bar (not shown). There is a tension means 19 such as a spring to bias the upper heating surface 14 in an open position, such as shown in FIG. 1, relative to a closed position closely adjacent the first lower heating surface 11 shown in FIG. 3. If one releases the downward pressure on the handle 20 on upper housing 15, the upper housing 15 into which the upper heating surface 14 is placed will spring open. This assures that an unattended tortilla or other food stuff will come to the attention of the user and reduce the chance of an overcooked or burnt food stuff. The user must pay attention to the business at hand.

There is a first heating means 30 (not shown) to heat the first lower heating surface 11, a second heating means, 31 (not shown) to heat the upper heating surface 14 and a third heating means 32 (not shown) to heat the second lower heating surface 16. Heating of the heating surfaces is accomplished by commercially available electric resistance heating and will not be given a detailed description. Also the temperature controls means may be of the conventional type such as a thermostat and it will be assumed that their operation is understood.

There is a first temperature control means 21 in the lower housing 13 to Control the temperature of the first lower heating means and the upper heating means. There is a second temperature control means 22 in the lower housing 13 to control the temperature of the second lower heating means. A first switch 23 is located in the lower housing 13 to interrupt power to the first lower and the upper heating means. There is also a second switch 24 in the lower housing 13 to interrupt power to the second lower heating means. A first indicator light 25 is located in the lower housing 13 to indicate power to the first lower and the upper heating means. There is a second indicator light 26 to indicate power to the second heating means. There is a power cord 35 to provide power from an AC power source (not shown) to heating means 30, 31, and 32.

The cooking apparatus 10 has a plurality of suction cup feet 27 on the lower housing 13 and a handle 20 on the upper housing 15 to position the upper heating surface 14 in the closely adjacent position relative to the first lower heating surface 11 as shown in FIG. 3. There is a grease groove 28 around the perimeter of the first lower heating surface 11 and the second lower heating surface 16 as shown in FIG. 1.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A cooking apparatus comprising:
   a. a first lower heating surface in a lower housing;
   b. an upper heating surface in an upper housing;
   c. a second lower heating surface in the lower housing;
   d. an adjustable hinge means hingingly connecting the lower and upper housing;
   e. a tension means to bias the upper heating surface in an open position relative to a closed position closely adjacent the first lower heating surface;
   e. a first heating means to heat the first lower heating surface;
   f. a second heating means to heat the upper heating surface;
   g. a third heating means to heat the second lower heating surface;

h. a first temperature control means in the lower housing to control the temperature of the first lower and the upper heating means;
i. a second temperature control means in the lower housing to control the temperature of the second lower heating means;
j. a power cord to plug into a power source;
k. a first switch in the lower housing to interrupt power to the first lower and the upper heating means;
l. a second switch in the lower housing to interrupt power to the second lower heating means;
m. a first indicator light in the lower housing to indicate power to the first lower and the upper heating means;
n. a second indicator light in the lower housing to indicate power to the second lower heating means; and
o. a handle on the upper housing to position the upper heating surface in the closely adjacent position relative to the first lower heating surface.

2. A cooking apparatus as described in claim 1 wherein the first lower, the upper and the second lower heating further comprise a coating thereon to reduce adherence of food stuffs.

3. A cooking apparatus as described in claim 1 further comprising a plurality of suction cup feet on the lower housing.

4. A cooking apparatus comprising:
a. a first lower heating surface in a lower housing with a coating thereon to reduce adherence of food stuffs;
b. an upper heating surface in an upper housing with a coating thereon to reduce adherence of food stuffs;
c. a second lower heating surface in the lower housing with a coating thereon to reduce adherence of food stuffs;
d. an adjustable hinge means hingingly connecting the lower and upper housing;
e. a tension means to bias the upper heating surface in an open position relative to a closed position closely adjacent the first lower heating surface;
e. a first heating means to heat the first lower heating surface;
f. a second heating means to heat the upper heating surface;
g. a third heating means to heat the second lower heating surface;
h. a first temperature control means in the lower housing to control the temperature of the first lower and the upper heating means;
i. a second temperature control means in the lower housing to control the temperature of the second lower heating means;
j. a power cord to plug into a power source;
k. a first switch in the lower housing to interrupt power to the first lower and the upper heating means;
l. a second switch in the lower housing to interrupt power to the second lower heating means;
m. a first indicator light in the lower housing to indicate power to the first lower and the upper heating means;
n. a second indicator light in the lower housing to indicate power to the second lower heating means;
o. a plurality of suction cup feet on the lower housing; and
p. a handle on the upper housing to position the upper heating surface in the closely adjacent position relative to the first lower heating surface.

5. A cooking apparatus as described in claim 4 further comprising a grease groove around the perimeter of the first and second lower heating surfaces.

* * * * *